(12) United States Patent
Andrzejewski et al.

(10) Patent No.: US 12,222,009 B2
(45) Date of Patent: Feb. 11, 2025

(54) CLUTCH ASSEMBLY FOR COUPLING AND DECOUPLING MEMBERS

(71) Applicant: Means Industries, Inc., Saginaw, MI (US)

(72) Inventors: Todd M Andrzejewski, Saginaw, MI (US); Joshua D Hand, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/566,573

(22) PCT Filed: Jun. 24, 2022

(86) PCT No.: PCT/US2022/034937
§ 371 (c)(1),
(2) Date: Dec. 1, 2023

(87) PCT Pub. No.: WO2023/278271
PCT Pub. Date: Jan. 5, 2023

(65) Prior Publication Data
US 2024/0255034 A1    Aug. 1, 2024

Related U.S. Application Data

(60) Provisional application No. 63/215,603, filed on Jun. 28, 2021.

(51) Int. Cl.
*F16D 11/14* (2006.01)
*F16D 28/00* (2006.01)
*F16D 11/00* (2006.01)

(52) U.S. Cl.
CPC .............. *F16D 11/14* (2013.01); *F16D 28/00* (2013.01); *F16D 2011/006* (2013.01)

(58) Field of Classification Search
CPC .......... F16D 11/14; F16D 28/00; F16D 65/46; F16D 65/66; F16D 11/00–16; F16D 2125/405
See application file for complete search history.

(56) References Cited

U.S. PATENT DOCUMENTS 5,054,594 A   10/1991   Kampf et al.
6,745,882 B2   6/2004   Ai
(Continued)

FOREIGN PATENT DOCUMENTS

WO    WO2017091433 A1    1/2017

OTHER PUBLICATIONS

PCT/US2022/034937, Search Report, Sep. 15, 2022.
PCT/2022/034937, Written Opinion, Sep. 15, 2022.
PCT/2022/034937, Search Strategy, Sep. 15, 2022.

*Primary Examiner* — Timothy Hannon
(74) *Attorney, Agent, or Firm* — Burgess Law Office, PLLC

(57) ABSTRACT

In some implementations, the device may include stationary and rotatable members. A locking element supported on the stationary member moves between an engaged, torque hold or transfer position where the locking element holds or transfers torque between the stationary member and the rotatable member and a disengaged, torque-free position where the locking element holds or transfers no torque between the stationary member and the rotatable member. The device may include a threaded shaft, with the locking element threadably received on the threaded shaft.

20 Claims, 9 Drawing Sheets

(56) References Cited

U.S. PATENT DOCUMENTS

| | | | |
|---|---|---|---|
| 10,247,252 B2 | 4/2019 | Littlefield et al. | |
| 2016/0377126 A1* | 12/2016 | Essenmacher | F16D 41/14 192/84.6 |
| 2018/0231071 A1 | 8/2018 | Shioiri et al. | |
| 2021/0140492 A1 | 5/2021 | Green et al. | |

* cited by examiner

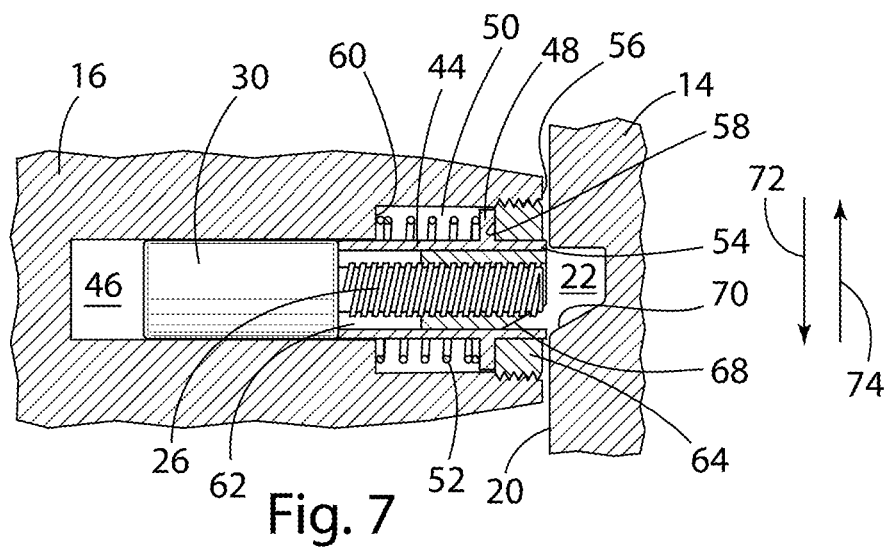
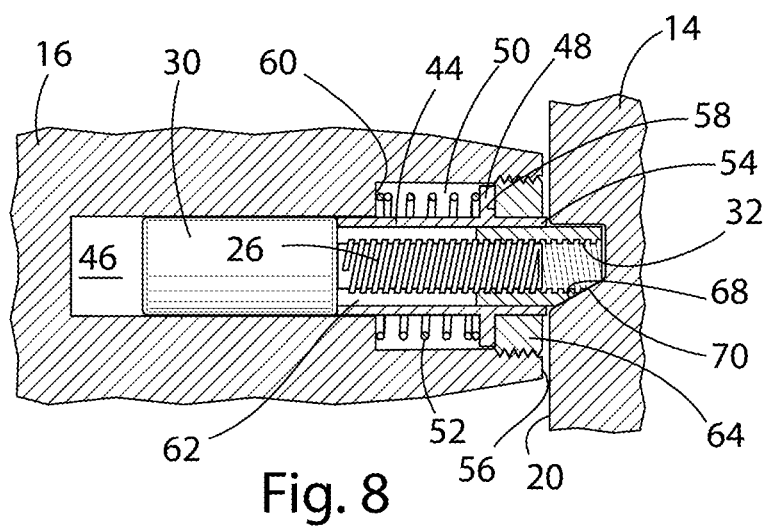

CLUTCH ASSEMBLY FOR COUPLING AND DECOUPLING MEMBERS

CROSS-REFERENCE TO RELATED APPLICATIONS

This application is a National Stage of International Application No. PCT/US2022/034937, filed Jun. 28, 2022, and claims the benefit of U.S. Provisional Application No. 63/215,603, filed Jun. 28, 2021. The disclosures of the above applications are incorporated herein by reference.

BACKGROUND OF THE INVENTION

1. Field of the Invention

The present invention generally relates to a clutch assembly; and more specifically, to a clutch assembly including a locking element for coupling and decoupling stationary and rotatable members.

2. Description of Related Art

A clutch assembly often includes first and second members and at least one locking element (e.g., a strut, a pawl, etc.). The locking element moves between a deployed position wherein the locking element extends from the first member and engages the second member and a non-deployed position wherein the locking element does not extend from the first member. Thereby, the first and second members are disengaged from each other.

The locking element may not be rigidly connected to a stationary first member. Consequently, during shock load (or "G-load") events, the locking element can unintentionally extend from the first member and engage the second coupling member. Unintended deployment of the locking element includes the locking element unintentionally moving from the non-deployed position to the deployed position. Unintended deployment of the locking element; i.e., the locking element unintentionally moving from the disengaged position to the engaged position due to shock load can be problematic.

SUMMARY OF THE INVENTION

A clutch assembly including a first member, a second member, and a locking element. The clutch assembly includes an actuator having a threaded shaft. The locking element is threadably received on the threaded shaft. The locking element is supported on one of the first and second members and movable between an engaged position wherein the locking element holds or transfers torque between the two members and a disengaged position wherein the locking element holds or transfers no torque between the two members.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a partial schematic cross-sectional view of a clutch assembly according to a further embodiment with the locking assembly disengaged.

FIG. 8 is a partial schematic, cross-sectional view of the clutch assembly of FIG. 7 with the locking assembly engaged.

DETAILED DESCRIPTION OF THE PREFERRED EMBODIMENTS

The following description of the preferred embodiment(s) is merely exemplary in nature and is in no way intended to limit the invention, its application, or uses.

While detailed embodiments of the present invention are disclosed herein, the disclosed embodiments are merely exemplary of the invention that may be embodied in various and alternative forms. The figures are not necessarily to scale; some features may be exaggerated or minimized to show details of components. Specific structural and functional details disclosed herein are not to be interpreted as limiting but merely as a representative basis for teaching one skilled in the art to variously employ the present invention.

Figure 1:
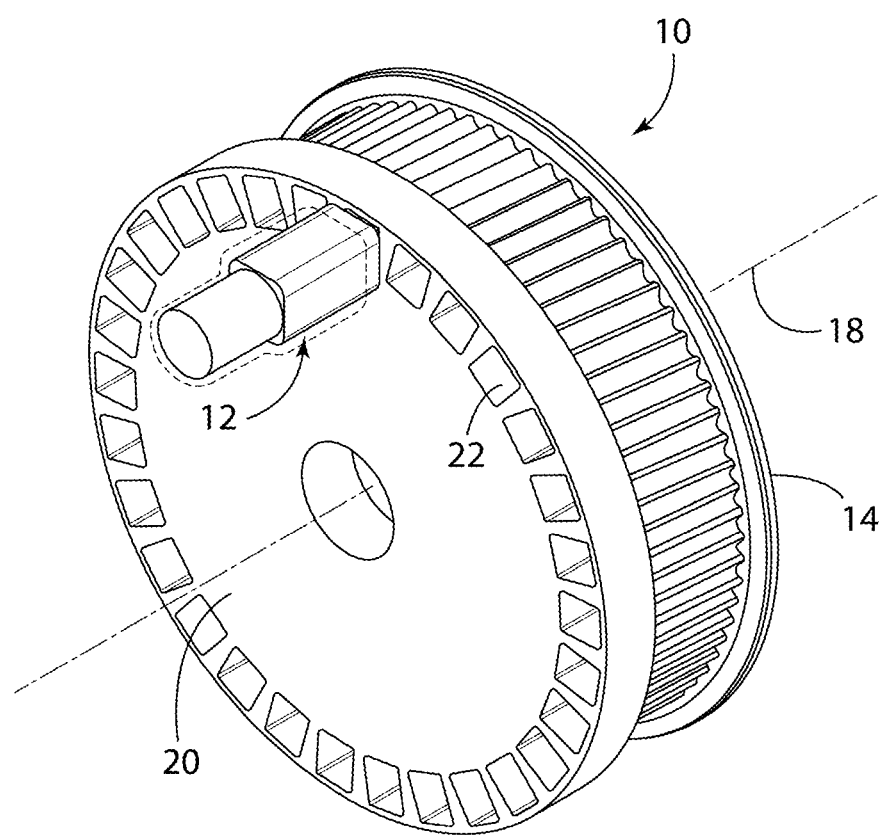
FIG. 1 is a perspective view of a clutch assembly having a locking assembly and rotatable member.
Figure 2:
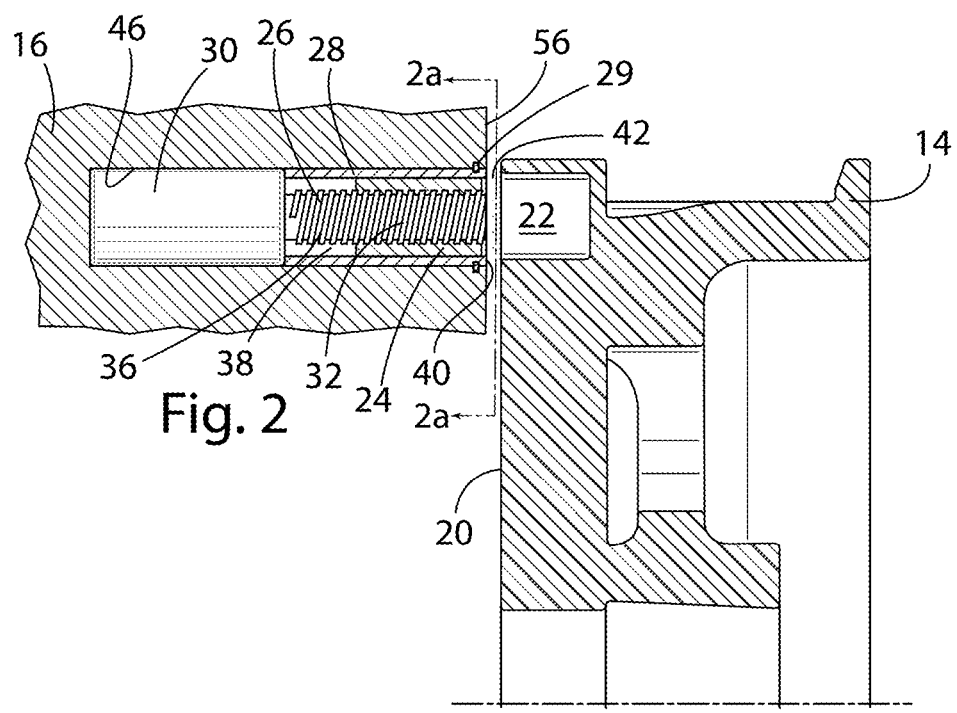
FIG. 2 is a partial cross-sectional view of the clutch assembly of FIG. 1 with the locking assembly disengaged.
Figure 2A:
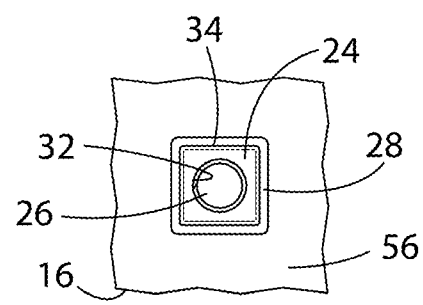
FIG. 2A is an end view, with portions removed from the locking assembly.
Figure 3:
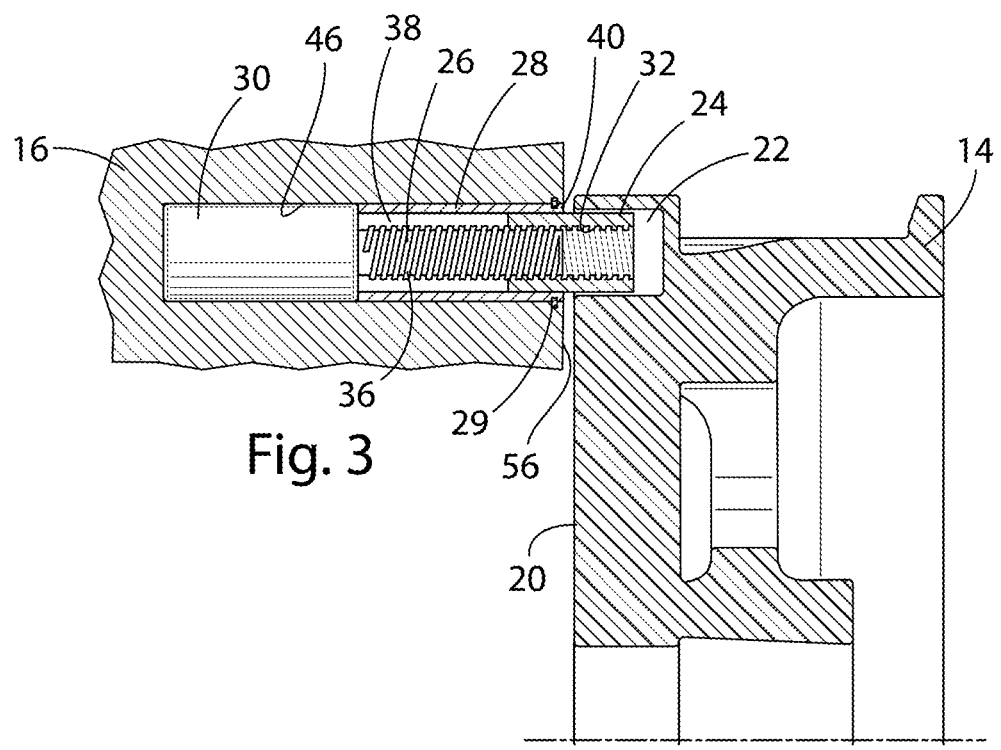
FIG. 3 is a partial cross-sectional view of the clutch assembly of FIG. 1 with the locking assembly engaged

FIG. 1 illustrates a perspective view of a clutch assembly 10 having a locking assembly, seen generally at 12, and a first member 14 and a second member 16, shown in FIGS. 2-3. The locking assembly 12 connects or couples the first and second members 14, 16 to each other and decouples the first and second members 14, 16 from each other. The first member 14 and second member 16 may be mounted for rotation relative to one another about a rotational axis 18. The locking assembly 12 may also connect or couple the first and second members 14, 16 when both are rotatable members rotating about a rotational axis. The term "couple" refers to connecting, fastening, or linking structures or mechanisms together.

A "clutch," which may be referred to as coupling or brake, establishes and disestablishes power flow paths from a power source to an output. Clutches and brakes are used to drive or hold members of a transmission. A clutch connects one element to another and may be referred to as a brake when it connects or ties an element to ground. "Ground" refers to a stationary or fixed member, for example, a transmission case. The term "clutch" also refers to a coupling used to connect and disconnect a driving and a driven part of a mechanism—for example, a motor side input shaft to a wheel side output shaft. The term "brake" further refers to a clutch wherein one of the members is drivably connected to a torque delivery element, and the other member is anchored and held stationary to a housing or tied to ground. The terms "coupling," "clutch," and "brake" may be used interchangeably. The term "transfer" when referring to the term "torque" refers to transmitting or causing torque to pass from one structure or mechanism to another, including transmitting or causing torque to pass to a stationary member or ground; for example, from the first member 14 to the second member 16.

In one embodiment, the first member 14 is rotatable, rotating about the rotation axis 18, and the second member 16 is a stationary member. The second or stationary member 16 may have a general form, e.g., a circular form, like the first or rotatable member 14. The second or stationary member 16 may also be a stationary locking plate or other fixed component. The locking assembly 12 is typically located adjacent to a portion of first or rotatable member 14, such as adjacent to a side or face 20 of the first or rotatable member 14. In one example, the locking assembly 12 is grounded to a second or stationary member 16. The second or stationary member 16 has a side or face 56. The sides or faces 20, 56 of the first and second members 14, 16 face each other.

The first or rotatable member 14 is mounted for rotation relative to the locking assembly 12 about the rotational axis 18. The side or face 20 faces toward the locking assembly 12. The side or face 20 of the first or rotatable member 14 has a plurality of angularly spaced locking features or structures 22, for example, notches. Each locking structure 22 is configured to receive a locking element 24 of the locking assembly 12. The locking structures 22 may be notches, apertures, open-ended receptacles, teeth, or other structures capable of engaging or mating with the locking element 24. The first or rotatable member 14 may be referred to as a notch plate.

The second or stationary member 16 may be referred to as a pocket plate. The second or stationary member 16 includes a receiving area, for example, a cavity, chamber, or pocket 46 in the second or stationary member 16 that extends to the side or face 56 of the second or stationary member 16. The locking assembly 12, positioned in the pocket 46, couples the first or rotatable member 14 to the second or stationary member 16 to prevent the first or rotatable member 14 from rotating and provides a torque path between the rotatable and stationary members 14, 16. In this case, the locking element 24 of locking assembly 12 engages the locking structure 22 of the first or rotatable member 14 to couple the first and second members 14, 16.

Conversely, disengaging the locking assembly 12 decouples the first or rotatable member 14 and the second or stationary member 16, allowing the first or rotatable member 14 to move independently of the second or stationary member 16, with no torque path between the first or rotatable member 14 and second or stationary member 16. When no torque path exists, to torque is transferred or held between the first and second members 14, 16. In this case, the locking element 24 of locking assembly 12 is not engaged to any locking structure 22 of the first or rotatable member 14 and the first and second members 14, 16 are decoupled.

FIGS. 1-3 show one embodiment of clutch assembly 10. The locking assembly 12 includes the locking element 24, a threaded shaft or leadscrew 26, a housing 28, and a motor 30. The housing 28 fits in the pocket 46 and secures or grounds the locking assembly 12 to the stationary member 16. The housing 28 can be secured in the second or stationary member 16 with a ring 29. Other retaining mechanisms can also be used, for example a ring member, cap, threaded member, or another mechanism to keep the housing in place. The housing could also be press or interference fit in the pocket. The housing 28 engages the motor 30, wherein the motor 30 is held in position between the housing 28 and the second or stationary member 16. In this embodiment, the motor 30, the threaded shaft or leadscrew 26, and housing 28 remain stationary, wherein rotation of the threaded shaft or leadscrew 26 imparts relative reciprocal motion to the locking element 24.

The locking element 24 is an elongated member having a threaded passageway 32 and a square head or shape 34. The threaded passageway of the locking element 24 is complementary to the threads 36 of the threaded shaft or leadscrew 26. The locking element 24 threads on the threaded shaft or leadscrew 26 between the threaded shaft or leadscrew 26 and housing 28. FIG. 2 shows the housing 28 has a passageway 38 having a square cross-section configured complementary to the square head or shape 34 of the locking element 24. The threaded shaft or leadscrew 26 and locking element 24 translate the rotary motion of the threaded shaft or leadscrew 26 to linear motion of the locking element 24 in the longitudinal direction of the threaded shaft or leadscrew 26. The complementary outer shape of the locking element 24 and inner shape of the passageway 38 in the housing 28 restrict rotational motion of the locking element 24 when the threaded shaft or leadscrew 26 rotates. When the threaded shaft or leadscrew 26 rotates, the locking element 24 travels along the longitudinal axis of the threaded shaft or leadscrew 26. Torque, rotational motion of the threaded shaft or leadscrew 26, converts to linear travel of the locking element 24. While the locking element 24 is shown with a square head or shape 34, other shapes could also be used to prevent rotation of the locking element 24 in the passageway 38 of the housing 28, thereby enabling linear travel of the locking element 24.

Operating the motor 30 in one direction causes the threaded shaft or leadscrew 26 to rotate clockwise. Operating the motor 30 in another manner causes the threaded shaft or leadscrew 26 to rotate counterclockwise. Clockwise rotation of the threaded shaft or leadscrew 26 causes the locking element 24 to move linearly along the threaded shaft or leadscrew 26 in one direction, for example, toward the side surface or coupling face 20 of first or rotatable member 14. Counterclockwise rotation of the threaded shaft or leadscrew 26 causes the locking element 24 to move linearly along the threaded shaft or leadscrew 26 in the opposite direction, for example, away from the side surface or coupling face 20 of the first or rotatable member 14 and into the pocket 46.

FIG. 2 shows the clutch assembly 10 with locking element 24 of locking assembly 12 disengaged from locking structure 22 of the first or rotatable member 14. The locking element 24 does not engage any locking structure 22 of the first or rotatable member 14. As illustrated, the locking element 24 has linearly moved along the threaded shaft or leadscrew 26 to a non-deployed position, in which the locking element 24 does not extend from or past the end 40 of the housing 28 and does not engage any locking structure 22 of the first or rotatable member 14. A gap or space 42 exists between the locking element 24 and locking structure 22. The second or second or stationary member 16 and first or rotatable member 14 are disengaged from each other. When the locking element 24 disengages, no torque transfers between the second or stationary member 16 and the first or rotatable member 14. The first or rotatable member 14 is free to move relative to the second or stationary member 16 because the locking element 24 is in a disengaged or torque-free position wherein the locking element 24 neither holds nor transfers torque between the second or stationary member 16 and the first or rotatable member 14.

With proper design, the threaded shaft or leadscrew 26 cannot be back-driven. Thus, a shock load administered while locking element 24 is in the disengaged position does not move the locking element linearly along the threaded shaft or leadscrew 26 toward any locking structure 22 of the first or rotatable member 14. The locking element 24 remains stationary; i.e., locking element 24 does not engage with a locking structure 22. Thus, the locking element 24 does not unintentionally deploy during shock load events.

FIG. 3 shows the locking element 24 of locking assembly 12 engaged with the locking structure 22 of the first or rotatable member 14. The locking element 24 has moved linearly along the threaded shaft or leadscrew 26 to a deployed position, extends from the end 40 of housing 28 and engages the locking structure 22 of first or rotatable member 14. Engagement of locking element 24 with locking structure 22 couples the second or second or stationary member 16 and first or rotatable member 14. When the locking element 24 is in the engaged position, the locking element 24 prevents rotary motion of the first or rotatable member 14 because the first or rotatable member 14 is engaged to the second or stationary member 16 via the locking element 24.

Again, with proper design, threaded shaft or leadscrew 26 cannot be back-driven. Thus, when administering a shock load while locking element 24 is in the engaged position, the locking element 24 remains stationary and does not move linearly along threaded shaft or leadscrew 26 away from the engaged locking structure 22 of first or rotatable member 14; i.e., locking element 24 does not disengage from locking structure 22. Accordingly, locking element 24 does not unintentionally cease engagement during high shock load events.

Figure 4:
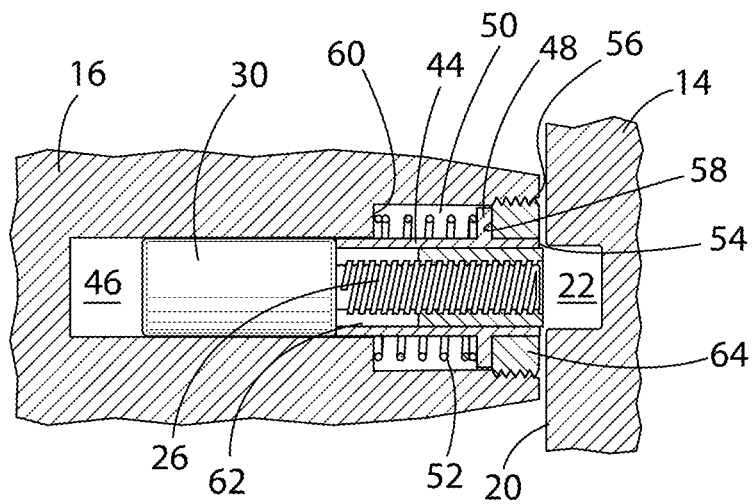
FIG. 4 is a partial schematic cross-sectional view of a clutch assembly according to another embodiment with the locking assembly disengaged.
Figure 5:
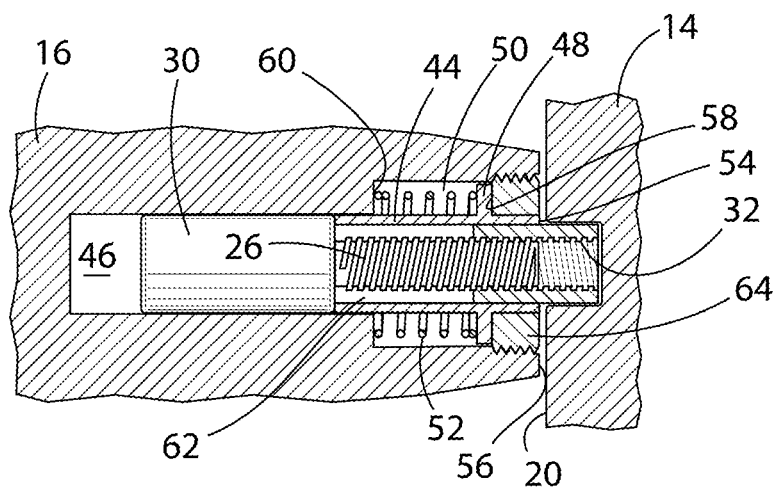
FIG. 5 is a partial schematic, cross-sectional view of the clutch assembly of FIG. 4 with the locking assembly engaged.
Figure 6:
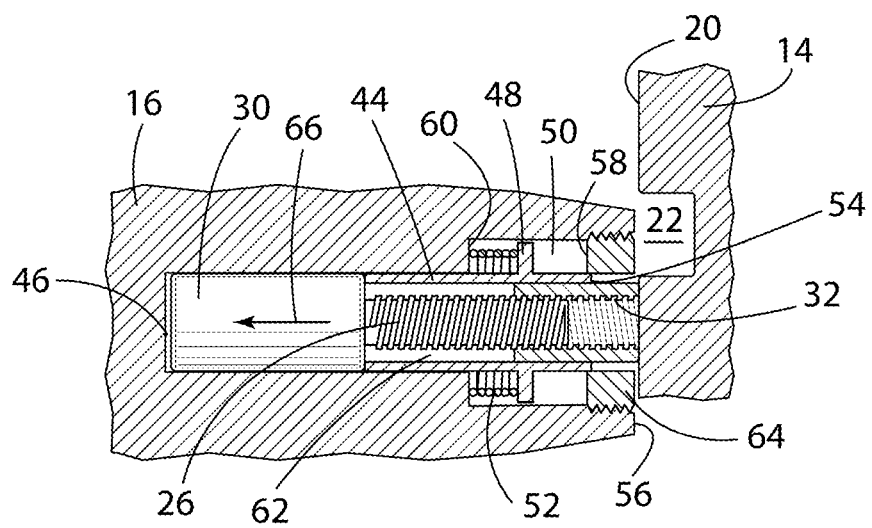
FIG. 6 is a partial, schematic, cross-sectional view of the clutch assembly of FIG. 4 with the extended but disengaged.

FIGS. 4-6 illustrate another embodiment of the clutch assembly 10. As shown, the clutch assembly 10 includes a movable housing or carriage 44 movably supported within the chamber or pocket 46 in the stationary member 16 between a forward or normal position, wherein a front or forward end or face 54 of the carriage 44 is adjacent the side or face 56 of the second or second or stationary member 16 located opposite the side surface or coupling face 20 of the first or rotatable member 14, and a rear or retracted position wherein the carriage 44 moves rearward, in the direction of the arrow 66, and is spaced from the side or face 56 of the second or second or stationary member 16 located opposite the side surface or coupling face 20 of the first or rotatable member 14.

A guide structure guides, positions, and controls the movement of the carriage 44 in the chamber or pocket 46. The guide structure may include tabs, fingers, posts, grooves, slots, or channels that cooperate to control the movement of the carriage within the chamber or pocket 46. One example of a guide structure is a locating member 48, for example, a radially extending flange, boss, or projecting member positioned in an indentation 50, for example, a slot, channel, or groove in the chamber or pocket 46. A resilient member 52, for example, a spring or other elastic member, positioned between the second or second or stationary member 16 and the carriage 44 urges the carriage 44 to a forward position, wherein a front or forward end or face 54 of the carriage 44 is adjacent the side or face 56 of the second or second or stationary member 16 located opposite the side surface or coupling face 20 of the first or rotatable member 14. The position of the front or forward end or face 54 of the carriage 44 need not be exact as long as it does not interfere with the movement of the first or rotatable member 14. Accordingly, the front or forward end or face 54 of the carriage 44 may extend above or past the side or face 56 of the stationary member 16. A forward end 58 of the indentation 50 forms a stop. The locating member 48 engages the forward surface or end 58 to position and locate the front or forward end or face 54 of the carriage 44. In one example, a threaded member, for example, a threaded plug 64 threads into the second or stationary member 16 to hold the carriage 44 in the chamber or pocket 46. An inner surface of the threaded plug 64 forms the forward surface or end 58 of the indentation 50 that stops or controls the movement of the carriage 44.

As shown in FIGS. 4-6, the locating member 48 moves axially in the indentation 50 between the forward end 58 and the rear end 60 of the indentation 50. The forward end 58 is the end of the indentation 50 closer to the first or rotatable member 14. The resilient member 52 is located between the rear end 60 of the indentation 50 and the locating member 48. As illustrated, the resilient member 52 urges the locating member 48 forward toward the first or rotatable member 14, whereby the locating member 48 contacts the forward end 58 of the indentation 50, placing the carriage 44 in the forward position.

Similar to the housing 28 in the preceding embodiment, the carriage 44 supports the locking element 24. The carriage 44 includes a passageway 62. The passageway 62 has a cross-sectional configuration complementary to the locking element 24, preventing relative rotation between the locking element 24 and carriage 44. The locking element 24 is housed in the passageway 62 for longitudinal movement. The threaded passageway 32 of the locking element 24 receives the threaded shaft or leadscrew 26. The motor 30 connects to the carriage 44 and the threaded shaft or leadscrew 26. The motor 30, threaded shaft or leadscrew 26, and carriage 44 move as a unit, while the locking element 24 moves independently. Depending upon the direction of motor 30 rotation, the motor 30 rotates the threaded shaft or leadscrew 26 and reciprocally moves the locking element 24. As illustrated in FIGS. 4-5, rotation of the threaded shaft or leadscrew 26 operates to move the locking element 24 into and out of engagement with the locking structure 22 on the first or rotatable member 14. In both instances, the resilient member 52 keeps the carriage 44 in the forward position. FIGS. 4-5 show the locking element 24 aligned with the locking structure 22.

FIG. 6 illustrates a condition wherein the locking element 24 and the locking structures 22 are misaligned, for example, angularly offset from one another. In this condition, actuation of the motor 30 and corresponding threaded shaft or leadscrew 26 drives or urges the locking element 24 outward until it engages the side surface or coupling face 20 of the rotational member 14. Because the locking element 24 cannot move farther forward, continued rotation of the threaded shaft or leadscrew 26 compresses the resilient member 52 and moves the carriage 44 rearward. As illustrated, the locking assembly 12, including the carriage 44, threaded shaft or leadscrew 26, and motor 30, all move rearward as a unit, with the locking element 24 moving toward the rear end 60 of the indentation 50 in the direction of the arrow 66 to the rear or retracted position. The indentation 50 configured such that the locking element 24 clears the locking structure 22 when the resilient member 52 is deformed. In this condition, the carriage 44 and locking element 24 are preloaded or continuously urged toward the first or rotatable member 14. Once the locking element 24 and locking structure 22 are aligned, see FIG. 5, the resilient member 52 pushes the carriage 44 and locking assembly 12 forward toward the first member 14, whereby the locking element 24 engages the locking structure 22.

As with the foregoing embodiment, the locking element 24 remains stationary when administering a shock load. The locking element 24 remains engaged based on the strength of the resilient member 52; i.e., the locking element 24 does not disengage from locking structure 22. The force, strength, or resiliency of the resilient member 52 may be determined based on anticipated shock loads and mass of the locking assembly 12, such that the resilient member 52 keeps the carriage 44 and locking assembly 12 in the forward position under anticipated shock loads. Accordingly, locking element 24 does not unintentionally cease engagement during shock load events. The motor 30 power must be sufficient to deform or compress the resilient member 52 if the locking element 24 and locking structure 22 are misaligned.

Figure 9:
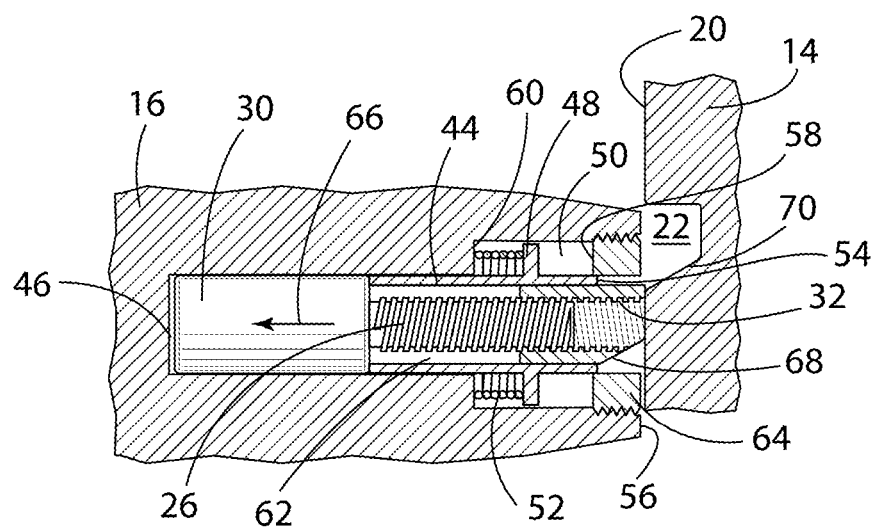
FIG. 9 is a partial, schematic, cross-sectional view of the clutch assembly of FIG. 7 with the extended but disengaged.

In the embodiment shown in FIGS. 7-9 the locking element 24 has a tapered or inclined end or surface 68. The tapered or inclined end or surface 68 of the locking element 24 provides an overrun function. The locking element 24 engages a tapered or inclined end or surface 70 the locking structure 22 of the first or rotatable member 14. As illustrated, the locking element 24 prevents rotation of first or rotatable member 14 in a first direction shown by arrow 72, e.g., clockwise, while allowing rotation of first or rotatable member 14 in an opposite, second direction shown by arrow 74, e.g., counterclockwise. In contrast, when the end portion of locking element 24 is not tapered, the locking element 24 prevents the rotation of first or rotatable member 14 in both the first and second directions 72, 74.

FIG. 7 shows the locking element 24 non-deployed and disengaged from locking structure 22 of first or rotatable member 14. Consequently, first or rotatable member 14 may rotate in both directions of rotation, shown by arrows 72, 74, i.e., both clockwise and counterclockwise directions relative to stationary member 16. Torque is not transferred or held between the rotatable member and stationary member 14, 16, and the first or rotatable member 14 rotates relative to stationary member 16.

FIG. 8 shows the locking element 24 deployed and engaged with a locking structure 22 of the first or rotatable member 14. Consequently, first or rotatable member 14 is prevented from rotating relative to second or second or stationary member 16 in one direction of rotation, see arrow 72; i.e., in the clockwise direction, and torque is transferred or held between the rotatable and stationary members 14, 16.

Like the previous embodiment, the locking assembly includes a carriage 44 and a resilient member 52 arranged so that carriage 44 moves between a forward or normal position, as shown in FIGS. 7-8, and a rear or retracted position shown in FIG. 9. The resilient member 52 moves the carriage 44 into the forward position.

FIG. 9 shows the locking element 24 deployed but disengaged from locking structure 22 of the first or rotatable member 14. The locking element 24 and the locking structure 22 have complementary inclined or tapered ends or surfaces 68, 70. When the first or rotatable member 14 rotates counterclockwise, in the direction of the arrow 74, the complementary tapered or inclined surfaces 68, 70 act on one another to generate an axial force in the direction of the threaded shaft or leadscrew 26. The axial force acts against the force generated by the resilient member 52 and drives the carriage 44 rearward, toward the rear end 60 of the indentation 50; doing so disengages the locking element 24 from the locking structure 22 of the first or rotatable member 14 allowing the first or rotatable member 14 to rotate in a counterclockwise direction, see arrow 74, relative to the stationary member 16.

Consequently, torque is transferred or held between rotatable and stationary members 14 and 16 while first or rotatable member 14 attempts to rotate relative to second or second or stationary member 16 in one direction of rotation, e.g., clockwise. Torque is not transferred or held between rotatable and stationary members 14, 16 when the first or rotatable member 14 rotates relative to the second or stationary member 16 in the other direction of rotation, e.g., counterclockwise. Accordingly, the first or rotatable member 14 is prevented from rotating relative to the second or stationary member 16 in one direction of rotation, arrow 72, e.g., clockwise, but may overrun in the other direction of rotation, arrow 74, e.g., counterclockwise.

Again, depending upon anticipated shock loads, the resiliency of the resilient member 52 and the degree of taper or incline of the locking element 24 and locking structure 22 may vary.

Figure 10:
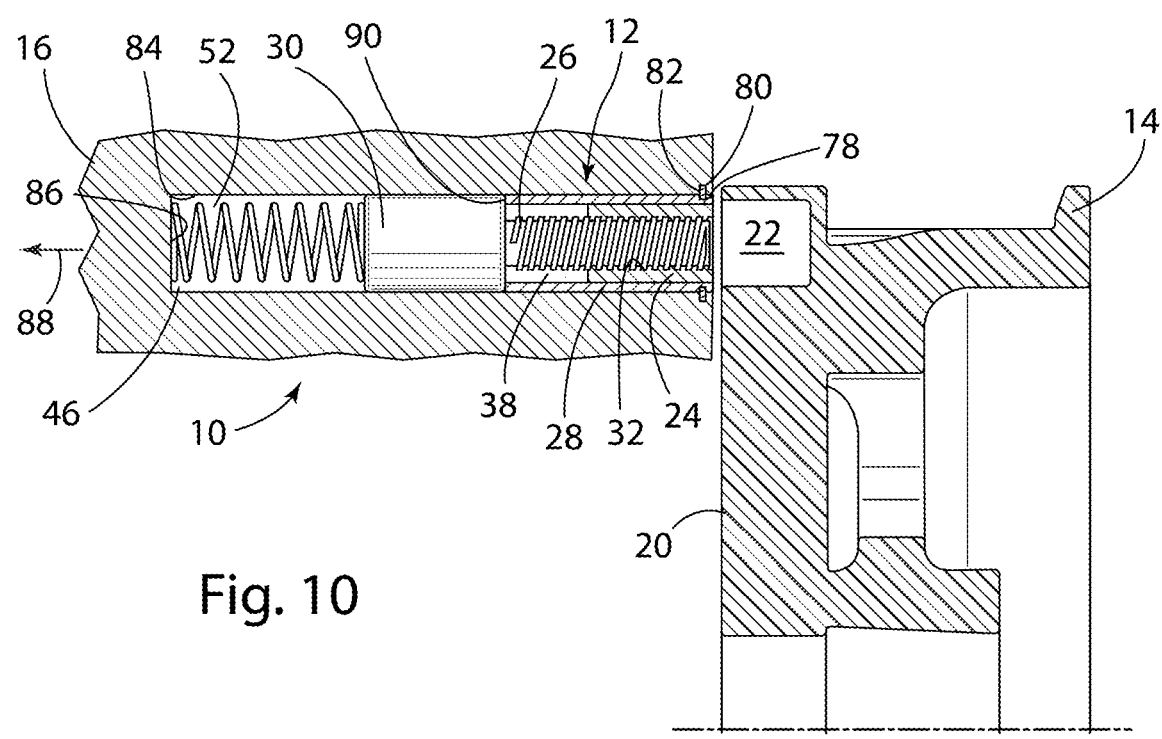
FIG. 10 is a partial, cross-sectional view of a clutch assembly according to a further embodiment with the locking assembly disengaged.

FIG. 10 shows another embodiment wherein the locking assembly 12 is positioned in the chamber or pocket 46. A retaining member 80, for example, an internal snap or retaining ring, fits in a groove 82 in an inner surface 84 of the chamber or pocket 46 and engages a corresponding groove 78 in the housing 28 to hold the housing 28 in position within the chamber or pocket 46. Other mechanisms may be used to hold or secure the housing 28 within the chamber or pocket 46.

The resilient member 52 extends between a rear wall 86 of the chamber or pocket 46 and the locking assembly 12. In one example, the resilient member acts directly on the motor 30 or an end of the locking assembly 12. Similar to previous embodiments, if the motor is energized when the locking structure 22 and locking element 24 are misaligned, the motor 30 moves rearwardly, in the direction of the arrow 88, toward the rear wall 86 of the chamber or pocket 46. When the motor 30 travels rearwardly toward the rear wall 86, it compresses the resilient member 52. The motor 30 and locking element 24 travel or move, independent of the housing 28, reciprocally in the chamber or pocket 46 between the rear wall 86 of the chamber or pocket 46 and an end 90 of the housing 28.

Figure 11:
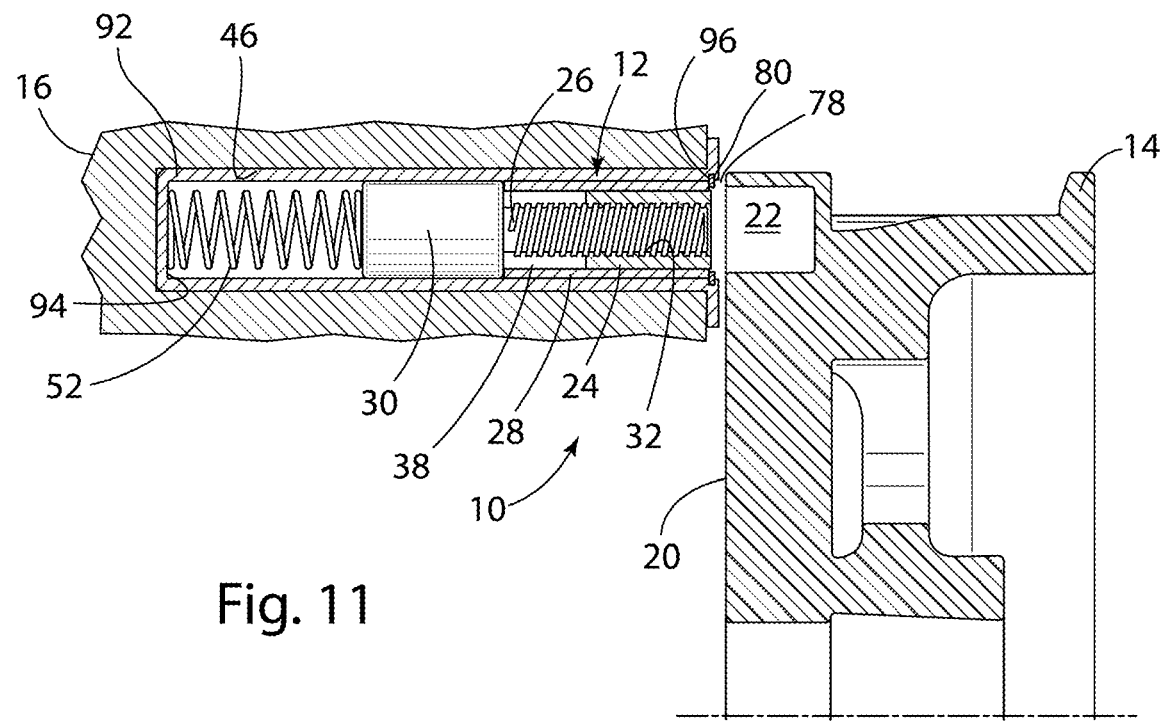
FIG. 11 is a partial, cross-sectional view of a clutch assembly of according to a further embodiment with the locking assembly disengaged.

FIG. 11 shows yet another embodiment with the locking assembly 12 positioned in a bushing 92. The resilient member 52 acts between a rear surface or wall 94 of the bushing 92 and the motor 30. Again, a retaining member 80, for example, an internal snap or retaining ring, positioned in the groove 78 in the housing 28 and a groove 96 in the bushing 92 may be used to hold or secure the locking assembly 12 within the bushing 92. The bushing 92 forms a case or container, which can be inserted into the chamber or pocket 46 and held therein using various fastening mechanisms. For example, the bushing 92 could be press-fit or held in place by a threaded fastener.

Like the foregoing embodiments, the resilient member 52 urges the locking assembly 12 outward towards the front of the second or stationary member 16. If the locking element 24 engages the first or rotatable member 14 in an area other than the locking structure 22, the resilient member 52 compresses, allowing the locking element 24, and locking assembly 12 to move rearwardly toward the rear surface or wall 94 of the bushing 92. When the locking element 24 lines up with the locking structure 22, the resilient member 52 pushes the locking assembly 12 and locking element 24 forward, whereby the locking element 24 engages the locking structure 22. The locking element 24 and locking structure 22 may also have respective tapered surfaces to provide an overrun capability.

In accordance with the embodiments set forth above, a locking assembly for coupling and decoupling a stationary member and a rotatable member of a clutch assembly to and from each other is provided. The locking assembly is located on the stationary member. The locking assembly includes a threaded shaft or leadscrew, a locking or engaging element, a reaction housing, and a motor. The locking element threads onto the threaded shaft and is sandwiched between the leadscrew and the housing. Operating the motor in one manner causes the threaded shaft to rotate clockwise. Operating the motor in an opposite manner causes the threaded shaft to rotate counterclockwise. Clockwise rotation of the threaded shaft causes the locking element to move linearly along the threaded shaft in one direction. Counterclockwise rotation of the threaded shaft causes the locking element to move linearly along the threaded shaft in the opposite direction. The threaded shaft provides a mechanism to translate rotary motion into linear motion.

The linearly movable along the threaded shaft, the locking element moves between a deployed position or engaged position in which the locking element extends out from the stationary member and engages a locking structure of the rotatable member to couple the stationary and rotatable members together and a non-deployed or disengaged position in which the locking element does not extend out from the stationary member and does not engage the locking structure of the rotatable member whereby the stationary and rotatable members are disengaged from each other. The locking element functions to engage and disengage the stationary and rotatable members to and from each other.

To prevent the load from being carried by the threaded shaft or leadscrew, the thread fit is loose enough to allow the locking element to contact the housing or carriage and not carry the load through the threaded shaft or motor. When the locking element is in the engaged position, the locking element prevents rotary motion of the rotatable member because the rotatable member is engaged to the stationary member via the locking element. When the locking element is in the disengaged position, rotary motion of the rotatable member relative to the stationary coupling member is not prevented because the rotatable member is disengaged from the stationary member.

The threaded shaft or leadscrew cannot be back-driven with a proper threaded shaft or leadscrew design. Thus, the locking element remains stationary, disengaged, and unable to engage when administering a shock load. Accordingly, the locking element does not unintentionally deploy during shock load events.

The locking assembly, which may also be referred to as the leadscrew actuated single strut insert ("SSI"); the SSI with leadscrew; the leadscrew actuated single locking element, or the single locking element insert with leadscrew, is designed such that when the mating rotary member, i.e., the rotatable coupling member, needs to stop rotation, the motor and threaded shaft/leadscrew is activated causing the locking element to move toward the rotary member. The locking element eventually moves far enough toward the rotary member and engages the rotary member with the load transferred through the housing or carriage. Torque is removed from the clutch assembly to disengage, i.e., torque is removed from the rotary member. Then, the motor and threaded shaft/leadscrew are activated, causing the locking element to move away from the rotary member and be removed from the rotary member. Motion is arrested in the locking assembly when not energized due to threaded shaft or leadscrew efficiency and inability to back drive.

As described, the locking assembly utilizes a non-traditional actuator and utilizes aspects of the actuator to prevent unintended engagement and unintended disengagement. The locking assembly may be utilized in a clutch assembly to arrest motion in two directions by engaging the locking element of the locking assembly to the rotary member of the clutch assembly.

The resilient member urges or drives the locking assembly forward, whereby the locking element contacts the rotatable member and engages the locking structure when properly aligned.

The locking element and locking structure may have complementary tapered or inclined surfaces enabling the rotatable member to overrun in one direction while locking in the opposite direction.

While exemplary embodiments are described above, it is not intended that these embodiments describe all possible forms of the present invention. Rather, the words used in the specification are words of description rather than limitation. It is understood that various changes may be made without departing from the spirit and scope of the present invention. Additionally, the features of various implementing embodiments may be combined to form further embodiments of the present invention.

The description of the invention is merely exemplary in nature, and thus, variations that do not depart from the gist of the invention are intended to be within the scope of the invention.

What is claimed is:

1. A clutch assembly comprising:
a first member;
a second member;
a locking element supported on the second member, the locking element moving between an engaged position wherein the locking element moves between the first member and the second member to lock the first member to the second member and prevent movement between the first member and the second member, and a disengaged position wherein the locking element transfers no torque between the first member and the second member whereby the first member is not locked to the second member and the first member and second member move relative to one another; and
a threaded shaft, the locking element threadably received on the threaded shaft.

2. The clutch assembly of claim 1, including a motor connected to the threaded shaft.

3. The clutch assembly of claim 1, wherein the first member includes a locking structure cooperating with the locking element when the locking element is in the engaged position.

4. The clutch assembly of claim 3, wherein the locking structure includes an aperture.

5. The clutch assembly of claim 1, including a resilient member acting on the motor.

6. The clutch assembly of claim 5, wherein the resilient member is a spring.

7. A clutch assembly comprising:
a stationary member;
a rotatable member;
a carriage movably supported on the stationary member;

a locking element supported on the carriage and moving independently of the carriage; and
a threaded shaft, the locking element threadably received on the threaded shaft, wherein rotation of the threaded shaft moves the locking element between an engaged position wherein the locking element transfers torque between the stationary member and the rotatable member and a disengaged position wherein the locking element transfers no torque between the stationary member and the rotatable member.

8. The clutch assembly of claim 7, including:
the stationary member including a chamber, the chamber including a guide structure;
the carriage engaging the guide structure and moving within the chamber between a forward position and a rear position; and
a resilient member urging the carriage to the forward position.

9. The clutch assembly of claim 7, including an actuator engaging the threaded shaft.

10. The clutch assembly of claim 9, wherein the actuator is connected to and moves with the carriage.

11. The clutch assembly of claim 7, wherein the rotatable member includes a locking structure, the locking structure cooperating with the locking element when the locking element is in the engaged position to hold torque in both directions of rotation of the rotatable member.

12. The clutch assembly of claim 7, wherein the rotatable member includes a locking structure, the locking structure cooperating with the locking element when the locking element is in the engaged position such that the locking element transfers torque in only one direction of rotation of the rotatable member.

13. The clutch assembly of claim 12, including the locking element having a tapered surface and the locking structure having a tapered surface.

14. A clutch assembly comprising:
a rotatable member having a plurality of locking structures;
a motor;
a housing connected to the motor, the housing having a passageway;
a leadscrew located in the passageway and connected to the motor; and
a locking element threadably engaging the leadscrew and moving in the passageway independent of the housing wherein the locking element is linearly movable along the leadscrew between a deployed position in which the locking element engages one of the locking structures of the rotatable member to connect the rotatable member to a stationary member and a non-deployed position in which the locking element is disengaged from all of the locking structures of the rotatable member whereby the rotatable member is not connected to the stationary member.

15. The clutch assembly of claim 14, wherein:
the leadscrew is configured to not be back driven, whereby when a shock load is administered while the locking element is in the deployed position, the locking element remains engaged and stationary, and the locking element does not linearly move along the leadscrew away from the locking structure of the rotatable member.

16. The clutch assembly of claim 14, wherein:
the leadscrew is configured to not be back driven, whereby when a shock load is administered while the locking element is in the non-deployed position, the locking element remains disengaged and stationary, and the locking element does not linearly move along the leadscrew toward any locking structure of the rotatable member.

17. The clutch assembly of claim 14, wherein:
the locking element is tapered such that when the locking element is in the deployed position and engaged with a locking structure of the rotatable member, rotation of the rotatable member relative to the stationary member is prevented in a first direction while allowing rotation of the rotatable member in an opposite, second direction.

18. The clutch assembly of claim 17, wherein:
the motor and housing arranged within a receiving area of the stationary member in which the motor and housing move as a unit between a normal position and a retracted position; and
a spring arranged between the housing and the stationary member to urge the motor and housing as a unit to the normal position wherein the motor and housing move to the retracted position when the rotatable member rotates in the opposite, second direction.

19. The clutch assembly of claim 14, wherein:
the locking element is shaped such that when the locking element is in the deployed position and engaged with a locking structure of the rotatable member, rotation of the rotatable member relative to the stationary member is prevented in both a first direction and an opposite, second direction.

20. The clutch assembly of claim 1, including a resilient member acting on a carriage.

* * * * *